United States Patent
Chan et al.

(10) Patent No.: US 10,749,826 B2
(45) Date of Patent: Aug. 18, 2020

(54) AUTOMATED RELEVANCE ANALYSIS AND PRIORITIZATION OF USER MESSAGES FOR THIRD-PARTY ACTION

(71) Applicant: International Business Machines Corporation, Armonk, NY (US)

(72) Inventors: Yuk L. Chan, Monroe, NY (US); Heidi L. Lagares-Greenblatt, Jefferson Hills, PA (US); Deepti M. Naphade, Cupertino, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 373 days.

(21) Appl. No.: 15/271,270

(22) Filed: Sep. 21, 2016

(65) Prior Publication Data

US 2018/0083902 A1    Mar. 22, 2018

(51) Int. Cl.
*H04L 12/58* (2006.01)
*H04L 29/08* (2006.01)

(52) U.S. Cl.
CPC .............. *H04L 51/12* (2013.01); *H04L 51/22* (2013.01); *H04L 51/26* (2013.01); *H04L 67/20* (2013.01)

(58) Field of Classification Search
CPC ......... H04L 51/12; H04L 67/20; H04L 51/22; H04L 51/26
See application file for complete search history.

(56) References Cited

U.S. PATENT DOCUMENTS

| | | | |
|---|---|---|---|
| 7,003,724 B2 | 2/2006 | Newman | |
| 9,715,680 B2* | 7/2017 | Arora | G06Q 10/1093 |
| 2001/0051935 A1* | 12/2001 | Sugiura | G06Q 10/10 706/12 |
| 2004/0073621 A1* | 4/2004 | Sampson | G06F 17/30067 709/209 |
| 2004/0093384 A1 | 5/2004 | Shipp | |
| 2005/0262210 A1 | 11/2005 | Yu | |
| 2006/0061488 A1* | 3/2006 | Dunton | G06Q 10/109 340/988 |
| 2007/0168430 A1 | 7/2007 | Brun et al. | |
| 2009/0300123 A1* | 12/2009 | Tsubouchi | H04M 1/72552 709/206 |

(Continued)

FOREIGN PATENT DOCUMENTS

WO    2016003469 A1    1/2016

*Primary Examiner* — Oanh Duong
(74) *Attorney, Agent, or Firm* — Cantor Colburn LLP; Teddi Maranzano

(57) ABSTRACT

Techniques are provided for performing automated operations to analyze incoming user messages. An indication of a message sent to a recipient user is received. Based at least in part on natural-language processing of the contents of the received message, the received message is analyzed. Such analysis includes determining an action date associated with the received message that is distinct from a date on which the received message was sent to the recipient user, and determining one or more action items corresponding to that action date. An indication of the action date and the one or more corresponding action items may be provided to each of one or more relevant third parties prior to the action date in order to facilitate the display of an additional message to the recipient user regarding the corresponding action items.

15 Claims, 2 Drawing Sheets

(56) References Cited

U.S. PATENT DOCUMENTS

| | | | |
|---|---|---|---|
| 2012/0272160 A1* | 10/2012 | Spivack | G06Q 10/10 |
| | | | 715/752 |
| 2014/0067497 A1* | 3/2014 | Butler | G06Q 30/02 |
| | | | 705/14.5 |
| 2015/0113079 A1 | 4/2015 | Etgar et al. | |
| 2015/0334222 A1 | 11/2015 | Cheng et al. | |
| 2015/0350116 A1* | 12/2015 | Bhagwan | H04L 51/00 |
| | | | 709/206 |
| 2015/0372955 A1 | 12/2015 | Janakiraman et al. | |
| 2017/0277740 A1* | 9/2017 | Ghotbi | G06F 17/30345 |

* cited by examiner

US 10,749,826 B2

AUTOMATED RELEVANCE ANALYSIS AND PRIORITIZATION OF USER MESSAGES FOR THIRD-PARTY ACTION

BACKGROUND

This disclosure relates to a method and a system to perform automated operations for incorporating automated relevance analysis, determination of user action dates and corresponding action items, and prioritization of incoming messages intended for recipient users.

Reading through all the messages we receive on a daily or weekly basis is time-consuming. Message content may often be lost or disregarded, since it is not typically sorted by relevance but rather by a date of issuance or subject text. Action items associated with a message that is lost or disregarded may therefore not be completed in a timely manner or at all.

SUMMARY

According to at least one embodiment, a method for analyzing incoming user messages. The method is implemented by one or more computing systems and comprises receiving an indication of a message sent to a recipient user, and analyzing, based at least in part on natural-language processing, the received message. Analyzing the received message includes determining, based at least in part on the content of the received message, an action date associated with the received message that is distinct from a date on which the received message was sent to the recipient user. Analyzing the received message further includes determining, based at least in part on the content of the received message, one or more action items corresponding to the action date. The method further comprises providing, based at least in part on the analyzing of the received message, an indication of the action date and the one or more corresponding action items to each of one or more relevant third parties in order to facilitate the display to the recipient user, prior to the action date and by the one or more relevant third parties, of an additional message regarding the one or more corresponding action items.

According to another embodiment, a non-transitory computer-readable storage medium has stored contents that, when executed, configures a computing system to perform a method for analyzing incoming user messages that comprises receiving an indication of a message sent to a recipient user, and analyzing, based at least in part on natural-language processing, the received message. Analyzing the received message includes determining, based at least in part on the content of the received message, an action date associated with the received message that is distinct from a date on which the received message was sent to the recipient user. Analyzing the received message further includes determining, based at least in part on the content of the received message, one or more action items corresponding to the action date. The method further comprises providing, based at least in part on the analyzing of the received message, an indication of the action date and the one or more corresponding action items to each of one or more relevant third parties in order to facilitate the display to the recipient user, prior to the action date and by the one or more relevant third parties, of an additional message regarding the one or more corresponding action items.

According to another embodiment, a computing system comprises one or more processors and at least one memory that includes instructions that, upon execution by a processor, cause the computing system to perform a method for analyzing incoming user messages. The method comprises receiving an indication of a message sent to a recipient user, and analyzing, based at least in part on natural-language processing, the received message. Analyzing the received message includes determining, based at least in part on the content of the received message, an action date associated with the received message that is distinct from a date on which the received message was sent to the recipient user. Analyzing the received message further includes determining, based at least in part on the content of the received message, one or more action items corresponding to the action date. The method further comprises providing, based at least in part on the analyzing of the received message, an indication of the action date and the one or more corresponding action items to each of one or more relevant third parties in order to facilitate the display to the recipient user, prior to the action date and by the one or more relevant third parties, of an additional message regarding the one or more corresponding action items.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

DETAILED DESCRIPTION

Figure 1:
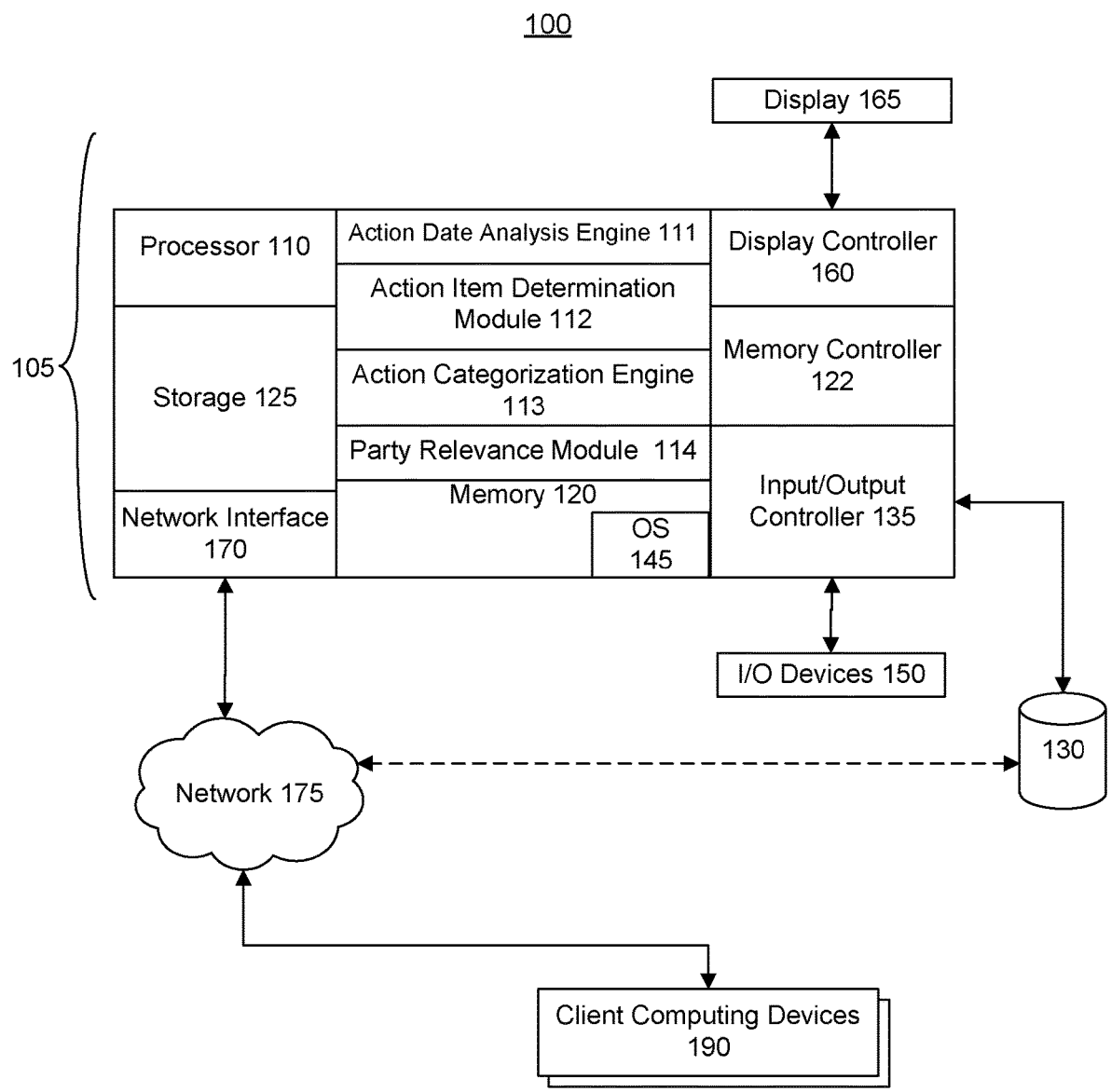
FIG. 1 depicts a block diagram of an exemplary network environment and computing system in accordance with an embodiment.

Typically, user messages are sorted according to a date each respective message was received, a subject field associated with each respective message. In particular, such messages are not typically sorted in accordance with the relevance of message content or on a timeframe associated with that message content.

For example, a message intended for a child's parent that is sent by the child's teacher may suggest items for the child to take on a field trip tomorrow. Typically, such a message may have been sent several days (or even weeks) before a carefully planned trip. The recipient user may not remember when the permission slip for the trip is due, nor remember the exact date of the field trip. In order to recall such details, the user has to search for the appropriate message around the time frame the message was sent. Furthermore, the user may have several messages from the teacher, as well as previous messages regarding other field trips. In addition, the user may receive such message in the middle of the week, possibly warranting an extra trip to the grocery store for items required for the field trip. A reminder of the field trip while the user is already at the grocery store to buy the extra snacks and/or other required items would be very helpful, as would a reminder to return the permission slip for the trip in a timely manner.

One or more embodiments described herein enable one or more processor-based computing systems to present a recipient user with a prioritized listing of multiple messages associated with that user, such as in accordance with an action date and/or corresponding action items associated with each of those messages. In addition, techniques described herein enable such processor-based computing systems to analyze incoming messages intended for a recipient user in order to determine such action dates and/or corresponding action items; to prevent the accidental deletion of such messages; and to provide relevant third parties with information gleaned from such messages in order to provide additional messages to the recipient user regarding such action dates and/or corresponding action items. In certain embodiments, the techniques described herein may also provide for the automatic deletion of messages that are deemed no longer relevant because they are associated with action dates that have already passed. In one or more embodiments, some or all of the techniques described herein may be performed by a Message Action Analysis and Prioritization (MAAP) system.

In certain embodiments, the MAAP system may determine to initiate configured services associated with action items and/or specific action categories that are determined to be associated with a received message. For example, based on analyzing the content of a received message the MAAP system may be configured to automatically make flight reservations for the recipient user, create tasks associated with the recipient user and/or other users, make dining reservations, set alarms on one or more devices associated with the recipient user, add one or more items to a shopping list or other tracking system associated with the recipient user, initiate ridesharing or other transportation services, or take other appropriate action.

Continuing the example above, third parties that perform the sale of services or supplies associated with the field trip may be interested in providing additional messages to the recipient parent user regarding the extra snacks and/or other required items for the field trip, especially as the action date of that field trip approaches.

Additionally, the message associated with the upcoming field trip may be accidentally deleted even though the message is useful for the recipient parent user until the field trip action date has passed. As another example, a recipient user planning on air travel in the near future may accidentally delete messages associated with that air travel, such as a boarding pass. The recipient user may even "clean up" the trash folder by permanently deleting the message that includes the field trip notification or boarding pass.

As used herein, the term "message" refers to any text-based communication intended for a user, and may in at least some embodiments include multimedia messages, e-mail messages, and textual messages that include additional non-text items. The term "action date" refers to any time or date expressly or implicitly indicated as being associated with an action, which typically but not exclusively indicates an action to be taken by a user. The term "third party" refers to any person, entity, or organization (or computing system operated by such a party) other than a user or operator of the MAAP system.

In certain embodiments, the MAAP system may operate in conjunction with an email application associated with a user that is the recipient of one or more messages received for analysis by the MAAP system, such as via a software application plugin executed in conjunction with the email application.

FIG. 1 illustrates a block diagram of a networked computing system 100 for use as an MAAP system in performing various techniques described herein. Such techniques may be performed or otherwise implemented via hardware, software (e.g., firmware), or combination thereof. In an exemplary embodiment, the methods described herein are implemented in hardware as the depicted MAAP system, which may include the microprocessor of a special or general-purpose digital computer, such as a personal computer, workstation, minicomputer, or mainframe computer. The computing system 100 therefore includes computer 105.

In the illustrated embodiment of FIG. 1, the computer 105 includes a processor 110, an action date analysis engine 111, an action item determination module 112, an action categorization engine 113, a party relevance determination module 114, a memory 115 coupled to a memory controller 120, internal storage 125, and one or more input and/or output (I/O) devices 150 that are communicatively coupled to the computer 105 via a local input/output controller 135, which in the illustrated embodiment is further communicatively coupled to external storage 130. The input/output controller 135 may include one or more buses or other wired or wireless connections, as is known in the art. The input/output controller 135 may further include additional elements, which are omitted for simplicity, such as controllers, buffers (caches), drivers, repeaters, and receivers, to facilitate communications. Further, the local interface may include address, control, and/or data connections to facilitate appropriate communications among the aforementioned components.

Also in the illustrated embodiment, the processor 110 is a hardware device for executing hardware instructions or software, particularly that stored in memory 115. The processor 110 can be any custom made or commercially available processor, a central processing unit (CPU), an auxiliary processor among several processors associated with the general-purpose computer 105, a semiconductor based microprocessor (in the form of a microchip or chip set), a macroprocessor, or generally any device for executing instructions.

The memory 115 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 115 may incorporate electronic, magnetic, optical, and/or other types of storage media. Note that the memory 115 can have a distributed architecture, where various components are situated remote from one another, but can be accessed by the processor 110.

The instructions in the memory 115 may include one or more separate programs, each of which comprises an ordered listing of executable instructions for implementing logical functions. In the example of FIG. 1, the instructions in the memory 115 include a suitable operating system (OS) 145. The operating system 145 typically controls the execution of other computer programs and may, among other capabilities, provide scheduling, input-output control, file and data management, memory management, and communication control and related services.

In an exemplary embodiment, I/O devices 150 may include, as non-limiting examples, a keyboard, mouse, printer, scanner, microphone, a network interface card (NIC) or modulator/demodulator (for accessing other files, devices, systems, or a network), a radio frequency (RF) or other transceiver, a telephonic interface, a bridge, a router, and other peripherals communicatively coupled to the computer 105 via input/output controller 135. In the depicted embodiment, the computing system 100 further includes a display controller 160 coupled to a display 165, and a network interface 170 communicatively coupled to a network 175. In the depicted embodiment, one or more client computing devices 190 are communicatively coupled to the network 175, such as client computing devices associated with users who interact with the MAAP system in order to have the MAAP system perform various operations regarding messages directed to those users, or to receive information from the MAAP system regarding individual messages or collections thereof.

The network 175 may be an IP-based network for communication between computer 105 and any external server, client and the like via a broadband or other network connection. The network 175 transmits and receives data between the computer 105 and external systems. In an exemplary embodiment, the network 175 may be a managed IP network administered by a service provider. The network 175 may be implemented in a wireless fashion, e.g., using wireless protocols and technologies, such as WiFi, WiMax, etc. The network 175 may also be a packet-switched network such as a local area network, wide area network, metropolitan area network, Internet network, or other similar type of network environment. The network 175 may be a fixed wireless network, a wireless local area network (LAN), a wireless wide area network (WAN) a personal area network (PAN), a virtual private network (VPN), intranet or other suitable network system and includes equipment for receiving and transmitting signals.

In at least some embodiments, the memory 115 may further include a basic input output system (BIOS) (omitted for simplicity). The BIOS is a set of routines that initialize and test hardware at startup, initiate execution of the OS 145, and support the transfer of data among the hardware devices. The BIOS is typically stored in ROM so that the BIOS may be executed when the computer 105 is activated. When the computer 105 is in operation, the processor 110 is configured to execute instructions stored within the memory 115, to communicate data to and from the memory 115, and to generally control operations of the computer 105 pursuant to the instructions.

Figure 2:
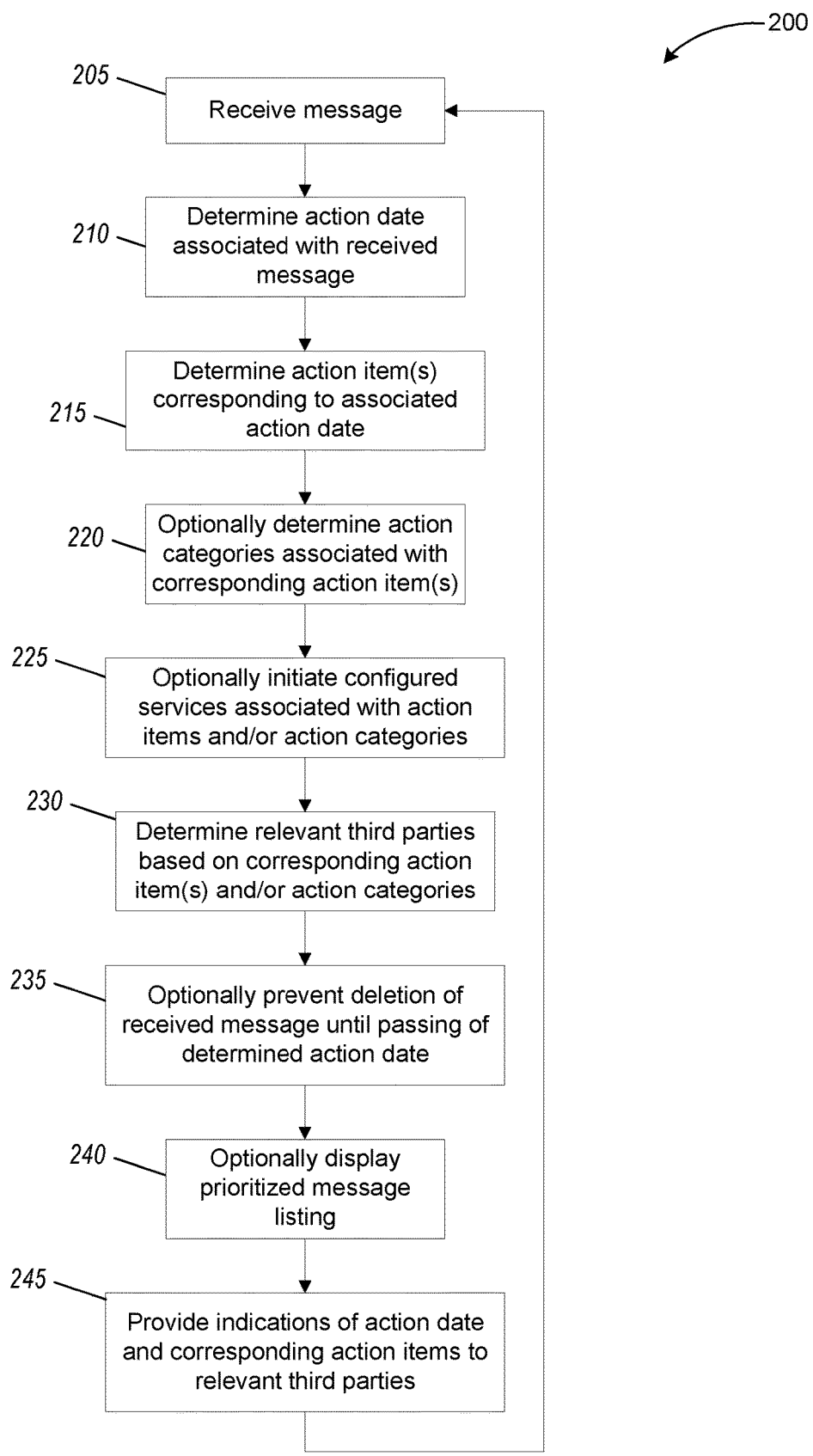
FIG. 2 depicts a process flow for a Message Action Analysis and Prioritization (MAAP) system in accordance with an embodiment of techniques described herein.

FIG. 2 depicts a process flow routine 200 for an MAAP system in accordance with an embodiment of techniques described herein. The routine begins at block 205, in which the MAAP system receives a message intended for a user recipient of the MAAP system. At block 210, the MAAP system begins analyzing the received message by determining one or more action dates associated with the received message of the received message, such as via the action date analysis engine 111 of FIG. 1. In at least the depicted embodiment, the MAAP system utilizes natural-language processing in order to determine deadlines, travel dates, due dates, or other dates specified by and/or associated with the contents of the received message.

At block 215, the MAAP system continues analyzing the received message by determining (such as via the action item determination module 112 of FIG. 1) one or more action items corresponding to each of the action dates determined in block 210 to be associated with the received message. For example, in instances where the received message contains a deadline for a work product or school assignment, the MAAP system may determine that the corresponding action item is a task associated with that work product or school assignment, such as "distribute TPS report" or "turn in algebra assignment." In various scenarios and embodiments, the MAAP system may determine that the corresponding action item is a document intended for the user as opposed to something to be provided by the user, such as a boarding pass attached to a message associated with an upcoming travel date, a barcode provided for redemption of a movie ticket, etc.

At block 220, the MAAP system optionally determines (such as via the action categorization engine 113 of FIG. 1) one or more action categories associated corresponding action items determined in block 215. For example, the MAAP system may determine that a received message that includes a boarding pass for a flight to Chicago landing at 10:00 am on the corresponding action date is associated with "travel," "Chicago," and "morning" categories. In one or more embodiments, particular categories may be predefined within the MAAP system, provided by the user via one or more preferences or other configuration information, and/or dynamically determined in accordance with one or more rules and/or machine learning engines.

At block 225, the MAAP system may optionally initiate one or more configured services associated with the action items and/or action categories respectively determined in blocks 215 and 220. For example, as discussed elsewhere herein, based on the analyzed content of the received message the MAAP system may automatically make flight reservations, create tasks, make dining reservations, set alarms, add items to a shopping list, initiate ridesharing or other transportation services, and take other appropriate actions. In at least some embodiments, in addition to providing portions of such functionality directly by the MAAP system, the initiation of such services by the MAAP system may be integrated with external applications or programmatic interfaces, such as those executing or available on one or more devices associated with the recipient user, or available via one or more networks (such as network 175 of FIG. 1).

At block 230, the MAAP system determines (such as via party relevance module 114 of FIG. 1) one or more third parties that are relevant to the received message, such as based on the corresponding action items determined in block 215 and/or action categories determined in block 220. As one possible continuation of the example provided above, the MAAP system may determine that the received message including the boarding pass is relevant to a Chicago hotelier, car rental agency, and restaurants serving breakfast near the destination airport. School assignments may be relevant to third parties involved in tutoring, school supplies, etc. In at least one embodiment, third parties may partner with an operator of the MAAP system to preselect particular action categories with which they would prefer to be associated when action items of those categories arise.

At block 235, the MAAP system optionally determines to prevent the deletion of the received message until the action date determined in block 210 has passed. In one or more embodiments, preventing the deletion of the received message may include copying the received message into a reserved folder or other type of partition, such as to ensure that the recipient user is able to find the received message even after intentionally or inadvertently deleting such message while it is still considered relevant by the MAAP system. For example, while stored in the temporary reserved folder or other partition, the ostensibly deleted message may be found by the user in search results and similar operations. Additionally, the MAAP system may periodically remove messages no longer considered relevant from the reserved folder, such as upon the passing of the action date determined in block 210. In at least some embodiments, the recipient user may configure various parameters regarding the retention of messages that are considered relevant by the MAAP system, even when the recipient user otherwise elects to delete such message.

At block 240, the MAAP system optionally displays a prioritized listing of multiple messages associated with the recipient user, such as in a manner prioritized based on the action date determined in block 210 to be associated with each of the received messages. In one or more embodiments, the prioritized listing may be displayed in accordance with preference information or other configuration settings associated with and/or provided by the recipient user.

As one example, a message received during winter may remind the recipient user to fertilize the user's garden plants in the first week of spring—a season which may arrive at different times in different time zones throughout the United States or other locations. The MAAP system may determine an action date corresponding to the official start of spring based on a time zone associated with the recipient user, and increase the display priority of the received message reminding the user to fertilize as that determined action date approaches. When the first week of spring arrives, the appropriate message may be placed by the MAAP system at the top of the prioritized listing of multiple messages associated with the recipient user. In addition, the MAAP system may present one or more reminders to the recipient user to purchase fertilizer in advance of the determined action date, such as by adding fertilizer to the user's shopping list during the week immediately preceding the start of spring.

At block 245, the MAAP system provides one or more indications of the action date and corresponding action items to those third parties determined to be relevant with respect to the received message in block 230. In one or more embodiments, the provision of such indications may be programmatic in nature, such as by various interactions of the MAAP system with an API or other interface of one or more services operated by the relevant third parties. As one non-limiting example, the MAAP system may provide an indication of the recipient user's need for fertilizer to one or more third parties deemed by the MAAP system to be relevant for action categories such as gardening, agriculture, etc. In at least some embodiments, the information provided to the relevant third parties may directly include an indication of the action date. In other embodiments, the MAAP system may provide information to the relevant third parties at a time prior to the determined action date, such as information regarding action items or action categories associated with a received message, but without expressly providing that action date to the relevant third parties themselves.

After block 245, unless it is determined to explicitly halt execution, the MAAP system returns to block 205 to await the receipt of an additional message.

In one or more embodiments, various implementations of the types of analysis described above may be performed in conjunction with one or more previously published or open source programming libraries (such as one or more APIs) that may perform and/or utilize natural-language processing. For example, in certain embodiments, the MAAP system may utilize one or more of the Alchemy API, the MALLET library, or other programming library.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It will be appreciated that in some embodiments the functionality provided by the routine or routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, it will be appreciated that in other embodiments the operations may be performed in other orders and in other manners. It will also be appreciated that particular data structures discussed above may be structured in different manners, such as by having a single data structure split into multiple data structures or by having multiple data structures consolidated into a single data structure. Similarly, in some embodiments, illustrated data structures may store more or less information than is described, such as when other illustrated data structures instead lack or include such information respectively, or when the amount or types of information that are stored is altered.

The present invention may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for analyzing incoming user messages comprising:
   receiving, by one or more computing systems, an indication of a message sent to a recipient user;
   analyzing, by the one or more computing systems and based at least in part on natural-language processing, the received message, wherein analyzing the received message includes:
     determining, by the one or more computing systems and based at least in part on content of the received message, an action date associated with the received message, the action date being distinct from a date on which the received message was sent to the recipient user; and
     determining, by the one or more computing systems and based at least in part on content of the received message, one or more action items corresponding to the action date;
   providing, by the one or more computing systems and based at least in part on the analyzing of the received message, an indication of the action date and the one or more corresponding action items to each of one or more relevant third parties;
   displaying to the recipient user, prior to the action date, an additional message regarding the one or more corresponding action items, wherein the additional message is received from one of the one or more relevant third parties; and
   preventing deletion of the received message prior to the action date,
   wherein the additional message regarding the one or more corresponding action items includes an advertisement regarding a product or service offered by the one or more relevant third parties that is related to the one or more corresponding action items, and
   wherein the additional message is displayed when the recipient user is in proximity to a location associated with the product or service offered by the one or more relevant third parties that is related to the one or more corresponding action items.

2. The computer-implemented method of claim 1, further comprising determining one or more action categories associated with the one or more corresponding action items.

3. The computer-implemented method of claim 2 wherein the one or more relevant third parties are a subset of a larger plurality of service providers, and wherein the method further comprises determining to provide the indication of the action date and the one or more corresponding action items to the one or more relevant third parties based at least in part on the one or more action categories associated with the one or more corresponding action items.

4. The computer-implemented method of claim 1 wherein preventing deletion of the received message prior to the action date includes storing a copy of the received message in a temporary relevance folder at least until the action date has ended.

5. The computer-implemented method of claim 1, further comprising displaying a prioritized listing to the recipient user of multiple messages associated with the recipient user based at least in part on a respective action date associated with each of the multiple messages.

6. The computer-implemented method of claim 1 further comprising tracking preference information associated with the recipient user, wherein providing the indication of the action date and the one or more corresponding action items includes providing to the one or more relevant third parties an indication of at least some of the preference information associated with the recipient user.

7. The computer-implemented method of claim 1 further comprising tracking historical information associated with the recipient user, wherein providing the indication of the action date and the one or more corresponding action items includes providing to the one or more relevant third parties an indication of at least some of the historical information associated with the recipient user.

8. A non-transitory computer-readable medium having stored contents that, when executed, configure a computing system to perform a method for analyzing incoming user messages, the method comprising:
   receiving an indication of a message sent to a recipient user;
   analyzing based at least in part on natural-language processing, the received message, wherein analyzing the received message includes:
      determining, based at least in part on content of the received message, an action date associated with the received message, the action date being distinct from a date on which the received message was sent to the recipient user; and
      determining, and based at least in part on content of the received message, one or more action items corresponding to the action date;
   providing, based at least in part on the analyzing of the received message, an indication of the action date and the one or more corresponding action items to each of one or more relevant third parties;
   displaying to the recipient user, prior to the action date an additional message regarding the one or more corresponding action items, wherein the additional message is received from one of the one or more relevant third parties; and
   preventing deletion of the received message prior to the action date,
   wherein the additional message regarding the one or more corresponding action items includes an advertisement regarding a product or service offered by the one or more relevant third parties that is related to the one or more corresponding action items, and
   wherein the additional message is displayed when the recipient user is in proximity to a location associated with the product or service offered by the one or more relevant third parties that is related to the one or more corresponding action items.

9. The non-transitory computer-readable medium of claim 8, wherein the method further comprises determining one or more action categories associated with the one or more corresponding action items.

10. The non-transitory computer-readable medium of claim 9 wherein the one or more relevant third parties are a subset of a larger plurality of service providers, and wherein the method further comprises determining to provide the indication of the action date and the one or more corresponding action items to the one or more relevant third parties based at least in part on the one or more action categories associated with the one or more corresponding action items.

11. The non-transitory computer-readable medium of claim 8 wherein preventing deletion of the received message prior to the action date includes storing a copy of the received message in a temporary relevance folder at least until the action date has ended.

12. The non-transitory computer-readable medium of claim 8, wherein the method further comprises displaying a prioritized listing to the recipient user of multiple messages associated with the recipient user based at least in part on a respective action date associated with each of the multiple messages.

13. The non-transitory computer-readable medium of claim 8 wherein the method further comprises tracking preference information associated with the recipient user, and wherein providing the indication of the action date and the one or more corresponding action items includes providing to the one or more relevant third parties an indication of at least some of the preference information associated with the recipient user.

14. The non-transitory computer-readable medium of claim 8 wherein the method further comprises tracking historical information associated with the recipient user, and wherein providing the indication of the action date and the one or more corresponding action items includes providing to the one or more relevant third parties an indication of at least some of the historical information associated with the recipient user.

15. A system, comprising:
   one or more processors; and
   at least one memory, the memory including instructions that, upon execution by at least one of the one or more processors, cause the system to perform a method for analyzing incoming user messages, the method comprising:
      receiving an indication of a message sent to a recipient user;
      analyzing, based at least in part on natural-language processing, the received message, wherein analyzing the received message includes:
         determining, based at least in part on content of the received message, an action date associated with the received message, the action date being distinct from a date on which the received message was sent to the recipient user; and
         determining, based at least in part on content of the received message, one or more action items corresponding to the action date;
      providing, based at least in part on the analyzing of the received message, an indication of the action date and the one or more corresponding action items to each of one or more relevant third parties;

displaying to the recipient user, prior to the action date an additional message regarding the one or more corresponding action items, wherein the additional message is received from one of the one or more relevant third parties; and
preventing deletion of the received message prior to the action date,
wherein the additional message regarding the one or more corresponding action items includes an advertisement regarding a product or service offered by the one or more relevant third parties that is related to the one or more corresponding action items, and
wherein the additional message is displayed when the recipient user is in proximity to a location associated with the product or service offered by the one or more relevant third parties that is related to the one or more corresponding action items.

\* \* \* \* \*